Sept. 11, 1923.  
W. A. ETHERTON  
SYSTEM OF DISTRIBUTION  
Filed Aug. 4, 1919  
1,467,361  
2 Sheets-Sheet 1

INVENTOR  
William A. Etherton,  
BY Delos G. Haynes  
ATTORNEY

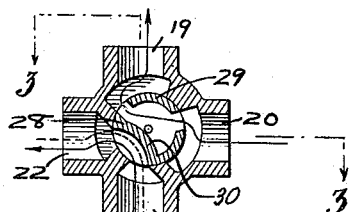
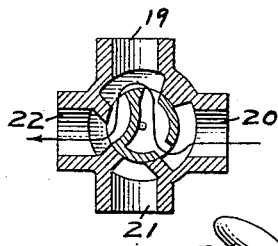
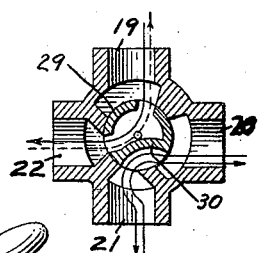
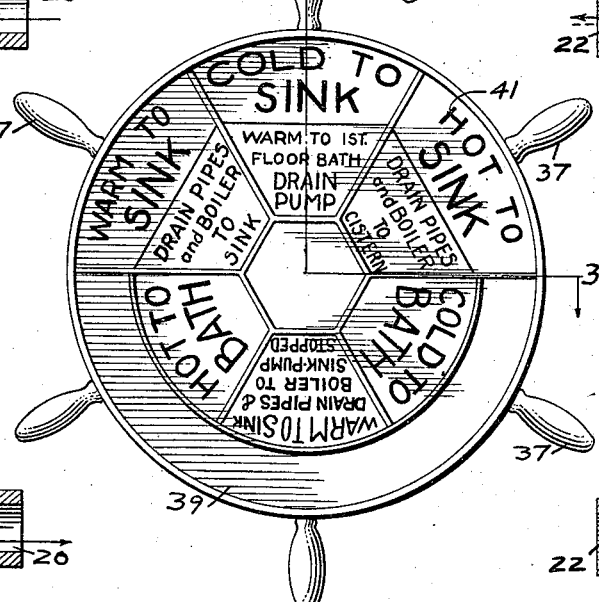
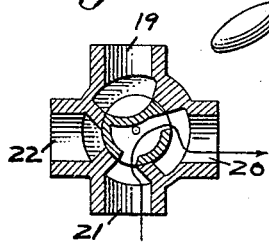
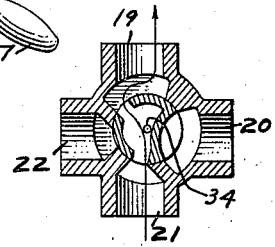
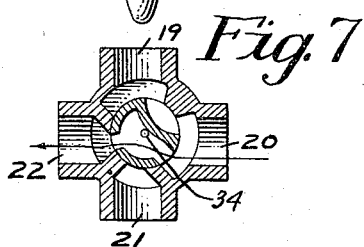

Patented Sept. 11, 1923.

1,467,361

UNITED STATES PATENT OFFICE.

WILLIAM ALONZO ETHERTON, OF AVA, ILLINOIS.

SYSTEM OF DISTRIBUTION.

Application filed August 4, 1919. Serial No. 315,044.

*To all whom it may concern:*

Be it known that I, WILLIAM ALONZO ETHERTON, a citizen of the United States, and a resident of Ava, in the county of Jackson and State of Illinois, have invented an Improvement in Systems of Distribution, of which the following is a specification.

This invention relates to a system of distribution and, particularly, to a system of hot and cold water distribution for farm and village houses for which water must be pumped by hand from cisterns and shallow wells.

The primary objects of the invention are to simplify the operation and construction of the system by combining in a single valve the connections and disconnections of conduits that otherwise can be effected only by two or more valves, stopcocks, or faucets, and, therefore, by a more complicated mechanism; also, to indicate in an improved and novel manner the results that obtain with each of the several adjustments of the valve. Secondary objects will be in part obvious and in part pointed out hereinafter.

The invention accordingly comprises the features of construction, combinations of elements, and arrangements of parts, which are exemplified in the construction, hereinafter described and the scope of the application of which will be indicated in the following claims.

In the accompanying drawings in which is shown one of various possible embodiments of this invention, Figure 1 is a diagrammatic elevation of a system of distribution;

Figure 2 is a face view of the valve;

Figures 4 to 9 are sections on the line 4—4 of Fig. 3, showing the valve in its six adjustments, each of which corresponds respectively to the adjacent legends on Fig. 2.

Similar reference characters indicate corresponding parts throughout the several views of the drawings.

Figure 1:
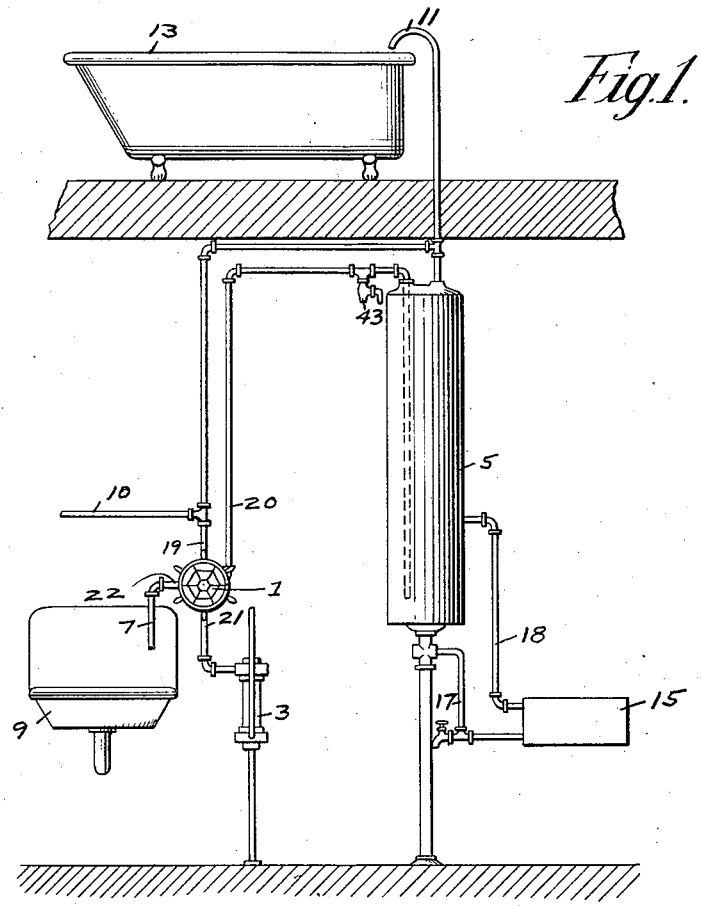

Referring now more particularly to Fig. 1 of the drawings, there is shown a system of distribution comprising a valve 1, a pump or other source of pressure 3, a reservoir 5, in the present instance a range boiler, and outlets such as the outlet 7 to the sink 9, outlets 10 to a first floor bath, laundry trays, lavatory, etc. (not shown), and outlet 11 to a second floor bath or other plumbing fixture 13.

The water front or other heating surface is shown conventionally at 15, as being connected to the boiler 5 through the intake 17 and discharge 18.

The valve 1 is connected to four conduits of which the upper one 19 runs to the discharge from the range boiler, the right hand conduit 20 extends to the intake to the boiler, the lower conduit 21 to the pump and the left hand conduit 22 to the sink outlet 7.

Figure 3:
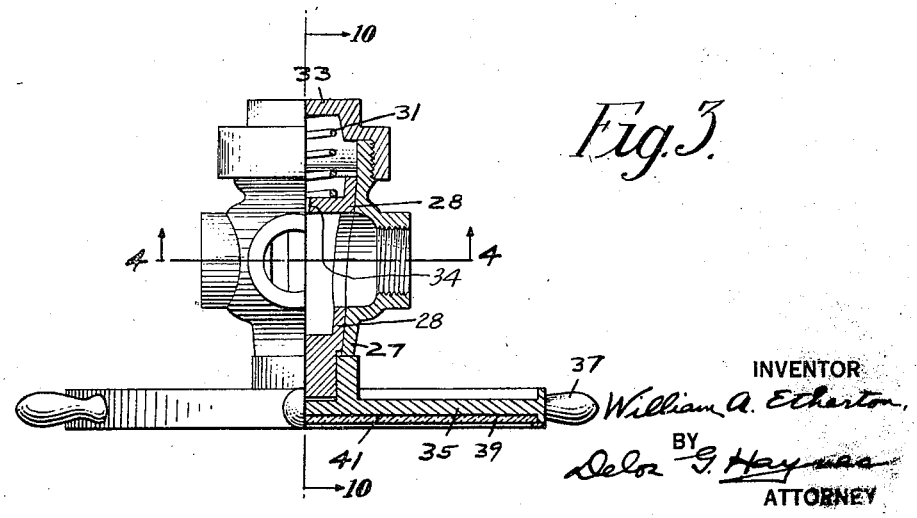
Figure 3 is a section on the line 3—3 of Figs. 2 and 4.

The valve comprises a conical seat 27 (Fig. 3) in which is fitted the stem 28 having the partitions or barriers 29, 30. The stem 28 is spring pressed against its seat by the compression spring 31, which is held in place by a suitable means such as a cap 33. When water under pressure fills the valve, the stem is also held against its seat by the preponderating pressure of water, which enters the cap through a small hole 34 in the stem, on the inclosed end of the stem. The stem is rotated by a dial or hand-wheel 35 having spokes 37 and a glass plate 39 upon or beneath which is a legend 41, shown in Fig. 2.

The valve is thus easily put together, not liable to derangement, and can be readily taken apart for cleaning or other purposes.

With the system arranged as shown in Fig. 4, ports 21 and 22 are connected and the passage thus formed between them is effectively disconnected from the other two ports and passage 19 and 20. This barrier to the intermingling of warm water from the two boiler pipes 19 and 20, with the cold water that flows direct from the source of supply through the valve to the outlet 7 can be effected without this invention only by the use of an additional valve, or by a valve which fails in other functions here provided for.

This lower passage 21 and 22 provides also for the draining of a hand-pump, when used, and its suction-pipe to a cistern or well, in the same manner as a plain spout on any hand-force-pump. Air flows through the valve to the pump, as indicated by the dotted arrow, when the pump handle is raised to its extreme height to make the plunger trip the check-valve in the pump and release the water.

The upper passage 19 and 20, with the pipes which it connects, provides for the siphoning of warm water from the bottom of the range-boiler to any outlet 10 which is lower than the surface of the water in the boiler. The siphon is primed by filling the pipes and the boiler from the source of supply, as in Fig. 5; it is actuated by adjusting the valve as in Figs. 4, 7, and 9 and, in the case of Fig. 4, by opening a faucet at the outlet 10; and it is made possible from a range-boiler by the open pipe 11 which admits air to the surface of the water in the boiler.

In this position of the valve, the longer partition 28 has its peripheral portion covering part of the port 20, and its other portion adjacent the upper side of the port 22 and the right side of the port 21. The shorter partition 29, bridges part of the port 19.

When the upper right-hand handle 37, Fig. 2, is turned to the uppermost position, the connections of water-ways are as indicated in Fig. 5. Water under pressure in the supply-pipe 21, will then be admitted through the valve passage 21—20 to fill the range-boiler 5, Fig. 1, and force hot water from the top of the boiler through the pipe 19, and the open valve passage 19—22 to the outlet 7, at the sink.

This adjustment of the valve permits also a reversal of flow through the same pipes, the boiler, and the pump, and the draining of the pipes and the boiler to the cistern as indicated by the dotted arrow in one passage through the valve and the solid arrow pointing downward in the other passage. The dotted arrow here, as in Fig. 4, represents an inflowing of air but the need of this provision is rendered nil by the air-inlet 11, which was explained for Fig. 4. As it is more often needful to drain the pipes than the range-boiler to prevent the freezing of water in the system, an air-cock 43, is provided in pipe 20 near the top of the boiler to break the siphon by admitting air at that point. It is obvious that with this adjustment of the valve, with the air-cock 43 closed, and with the siphon primed, the pump can be primed with water from the range-boiler.

The third position of the stem of the valve, illustrated in Fig. 6, holds water confined in pipe 20, prevents an outflowing of water through port 22, obviates the need of a faucet at outlet 7, and opens a cold-water-passage from the supply-pipe to bath-tubs or other plumbing fixtures on the first and second floors.

The fourth and sixth adjustments of the valve, as shown by Figs. 7 and 9, give the same results, viz: they cut off the supply-pipe from the upper part of the system; they connect the other three pipes and release the flow of warm water from the bottom of the range-boiler to outlet 7, at the sink, as indicated by the arrows; and they provide for the draining of pipes and boiler to the sink in a manner analogous to that explained for draining to cistern in installations which provide an additional storage-tank or boiler, placed higher than the range-boiler, the adjustment shown in Fig. 7 is used to stop the flow of water through the valve when the storage tank is being filled, and the corresponding sector on the dial is worded accordingly. This use of the valve, however, necessitates the use of a faucet to close outlet 7, at the sink.

The fifth adjustment of the valve, shown by Fig. 8, opens again the passage for cold water through ports 21 and 20 to the bottom of the range-boiler as in adjustment two, Fig. 5; but hot water is here prevented from flowing through the valve and it must find an outlet through one of the pipes 10 or 11, to a bath-tub or other fixture on the first or second floor. The provision in this valve for closing port 22 in this adjustment here again obviates the need of a faucet at outlet 7, to the sink.

The above describes the several adjustments of the valve as applied to the system for which it is especially designed and which is here illustrated in Fig. 1 in a simple form. Some of the combinations can be effected with another valve, and all of the combinations can be made with two or more valves of other designs; but all of the combinations here shown and described are effected by a single valve. The application of this valve to other systems of distribution is obvious from the descriptions here given.

The dial 35 rotates in either direction with the spokes or handles 37, it being understood that the position in which the valve is at any time, corresponds to the legend that is uppermost at that time; that is, the valve in the first or Fig. 4 position is effective for cold water to the sink, or for warm water to the bath-outlet 10, or for draining the pump. If the dial be turned counter-clockwise sixty degrees, so that the legend, "Hot to sink" etc., is uppermost and therefore most easily read, the valve is then in the second position illustrated in Fig. 5, for furnishing hot water to the sink, for draining the pipes and boiler to the cistern, and for priming the pump with water from the boiler should the pump have been drained as indicated for Fig. 4. Another sixty-degree counter-clockwise rotation of the dial brings the "Cold to bath" legend uppermost, corresponding to the third or Fig. 6 position of the valve, for furnishing cold water to either of the two bath-outlets 10, 11. Analogous connections are made with the other three illustrated positions of the valve.

With the valve of the present invention it is thus possible to connect adjacent ports with each other in pairs, or to connect one pair without connecting the other, or to connect opposite ports with one of the remaining ports closed or to connect opposite ports with both of the remaining ports closed. It is possible with this valve and with the system of distribution here shown to conduct water in both directions through each of the four pipes which attach thereto.

In view of the above, it is believed that the various features of this invention will be clear without further elaboration and it will be seen that with the system and valve herein described, the several objects of the inventions are achieved and other advantageous results attained.

As many changes could be made in carrying out the above construction without departing from the scope of the invention, it is intended that all mater contained in the above description or shown in the accompanying drawings shall be interpreted as illustrative and not in a limiting sense.

I claim:

1. A system of distribution combining a pump, a valve, a heating device, a boiler connected thereto, and a plurality of outlets at different levels, the valve permiting cold, hot or warm water to pass to the several outlets without requiring the operation of additional elements other than the usual faucets at said outlets.

2. A system of distribution comprising a pump, a valve, a heating device, a boiler connected thereto, and a plurality of outlets at different levels partly below the top of the range boiler and partly above it, the valve permitting cold or heated water to pass to the several outlets without requiring the operation of additional elements other than the usual faucets at said outlets, the valve further permitting the draining of the several parts; and an air cock above the top of the boiler to permit draining of the pipes without draining of the boiler.

In testimony whereof, I have signed my name to this specification this 31st day of July, 1919.

WILLIAM ALONZO ETHERTON.